United States Patent [19]

Lafont et al.

[11] Patent Number: 4,488,614
[45] Date of Patent: Dec. 18, 1984

[54] AIR-CUSHION VEHICLES

[75] Inventors: André Lafont, Paris; Michel Rabier, Versailles; Michel Guedon, Rambouillet; Guy Herrouin, Paris, all of France

[73] Assignee: Societe D'Etudes et de Developpement des Aeroglisseurs Marins, Terrestres et Amphibies (SEDAM), Paris, France

[21] Appl. No.: 407,264

[22] Filed: Aug. 11, 1982

[30] Foreign Application Priority Data

Aug. 12, 1981 [FR] France ............... 81 15594

[51] Int. Cl.³ ............................... B60V 1/04
[52] U.S. Cl. ........................ 180/127; 180/128
[58] Field of Search ............ 180/127, 128, 116

[56] References Cited

U.S. PATENT DOCUMENTS

| 3,540,542 | 11/1970 | Hopkins | 180/127 |
| 3,752,253 | 8/1973 | Hopkins et al. | 180/127 |
| 3,951,227 | 4/1976 | Lafont | 180/127 |
| 3,966,012 | 6/1976 | Crewe | 180/127 |
| 4,046,216 | 9/1977 | Cook | |

FOREIGN PATENT DOCUMENTS

| 457242 | 8/1971 | Australia |
| 2465264 | 9/1979 | France |
| 1448983 | 10/1972 | United Kingdom |
| 2058697 | 9/1980 | United Kingdom |

Primary Examiner—David M. Mitchell
Assistant Examiner—Donn McGiehan
Attorney, Agent, or Firm—Fleit, Jacobson, Cohn & Price

[57] ABSTRACT

An air-cushion vehicle comprising a lifted structure, a central cushion, and a peripheral lift arrangement in which each lobe of the outer skirt projects outside the lifted structure and preferably surrounds an inner skirt.

Each lobe extending downwardly is hollow with an open lower end and has a lower part to which is attached an upper part or cover connected along its upper edge to the lifted structure along a rectilinear horizontal line. The upper part or cover is also connected to the lifted structure along two spaced rectilinear segments at either end of the upper edge and disposed in respective vertical planes.

7 Claims, 5 Drawing Figures

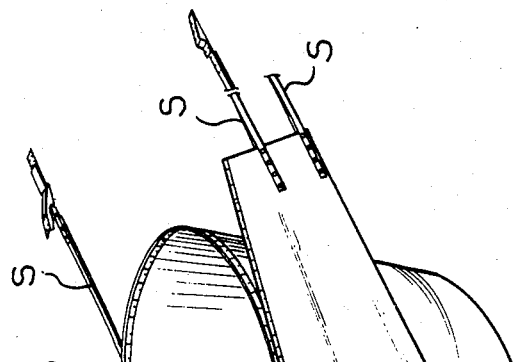

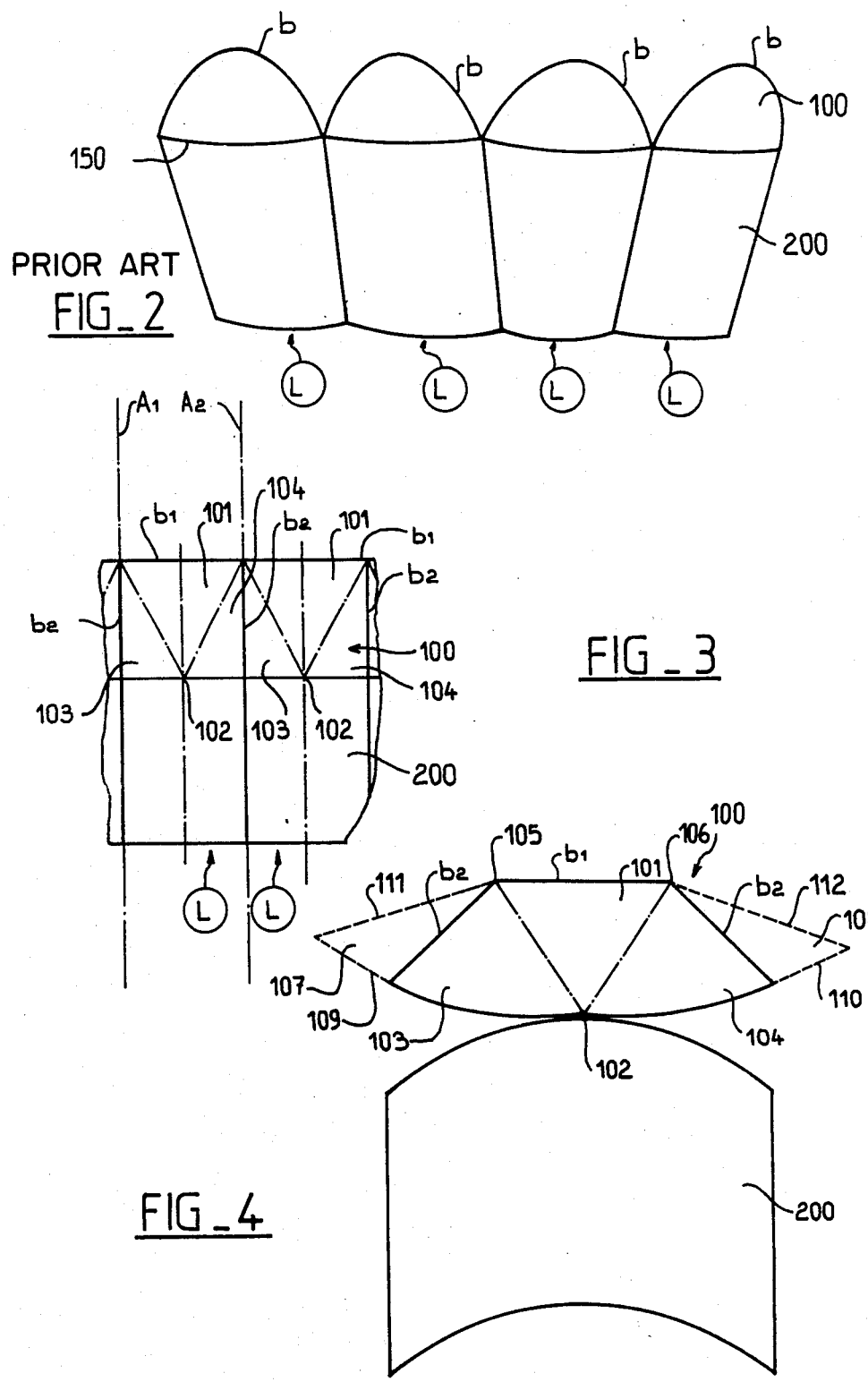

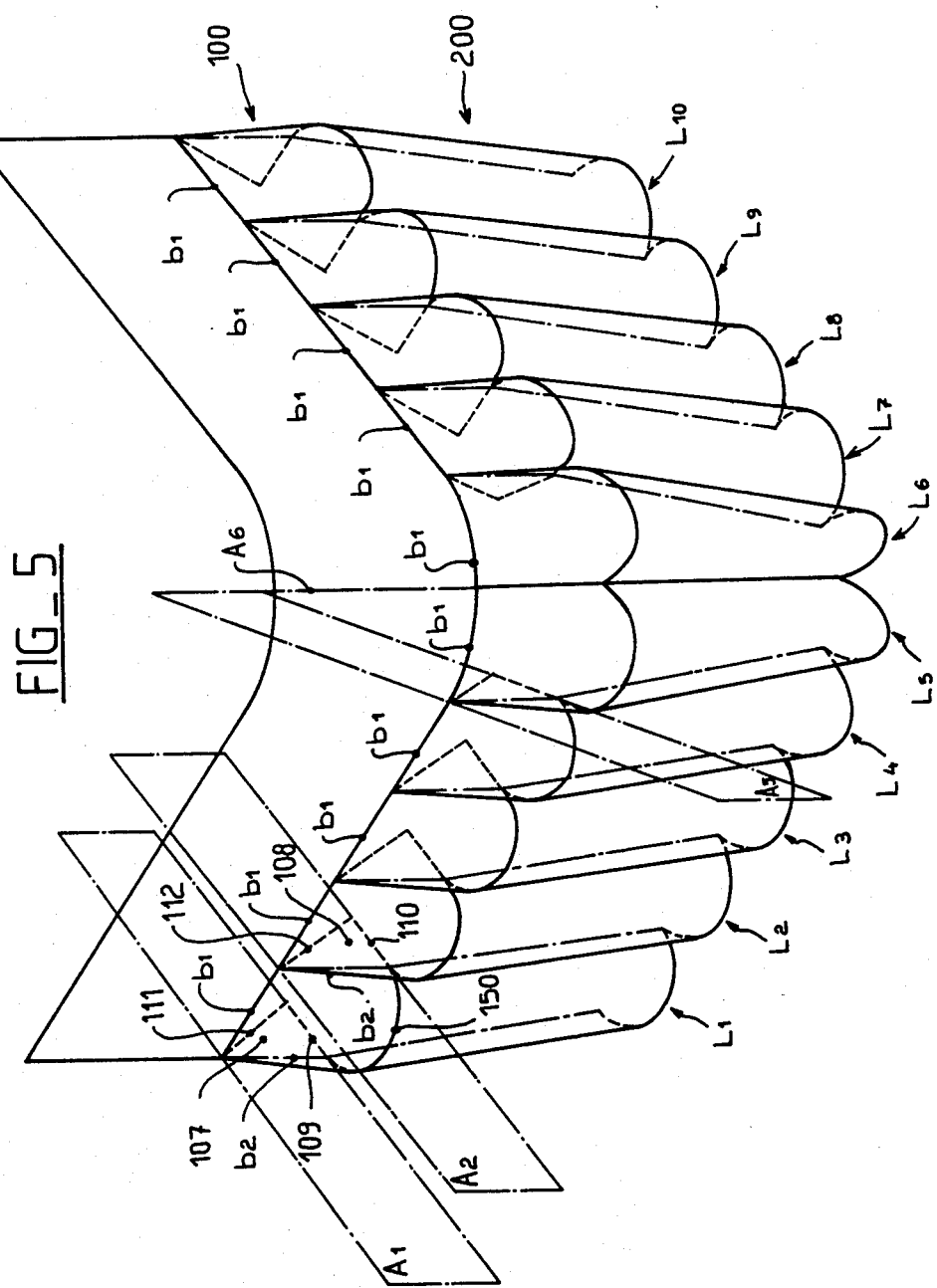

AIR-CUSHION VEHICLES

This invention relates to vehicles or machines travelling on cushions of pressurized fluid, also called ground-effect machines, and concerns an improvement to ground-effect vehicles or machines described in French Patent Specification No. 2 465 624.

Hereafter, in order to simplify the explanation, we shall speak solely of air-cushion vehicles, without this expression being limiting.

More precisely, the invention relates to air-cushion vehicles of the type described in one or other of two French Pat. Nos. 2 181 251 and 2 301 422.

These two patents are mentioned here as a reference, it being understood that it is possible to refer to them to obtain a further understanding in relation to the description herebelow.

More precisely still, the invention relates to air-cushion vehicles of the type in which the lift of a structure is ensured by a plurality of air cushions suspended from the structure and defined by flexible skirts, thus defining a central lift cushion and a peripheral arrangement comprising a plurality of closed adjacent cells (or compartments), defined on the outside by an outer multilobular wall, in which each lobe of the outer wall is constituted by the assembly of an upper part which diverges in a downwards direction with respect to the structure and of a lower part of revolution, which converges in a downwards direction with respect to the structure, in such a way that the entire lobe projects outside the said structure, hereafter, in order to simplify the explanation, it will be stated that these vehicles comprise an outer "multilobular" skirt.

FIGS. 1 and 2 of the accompanying drawings illustrate an air-cushion vehicle of the type described in French Patent Specification No. 2 465 624, the attached FIG. 1 being identical to FIG. 1 of that French Specification.

It shows one of the cells C of the peripheral arrangement of an air-cushion vehicle of the aforedescribed type. Such a cell C comprises an outer skirt constituted by a plurality of lobes such as L, each lobe laterally surrounds a preferably cylindrical or frustoconical skirt F (closed or not closed), thus being bilaterally tangential to the latter, in a sufficient area in order to ensure the seal. As illustrated, each lobe L has an arcuate shape, the sides l of the lobe being kept under tension by straps S or similar members. The upper edge b of the skirt is naturally connected in a sealed manner to the structure of the platform.

Each lobe is constituted by the assembly of an upper part 100 and of a lower part 200, connected along a flat connecting curve 150. Each of the two parts 100, 200 is preferably cylindrical or frustoconical, the two parts being similar (cylinders of the same radius or truncated cones of the same conicity). As can be seen clearly from FIG. 1, the part 100 diverges in a downwards direction from the centre of the lobe, whereas the part 200 draws nearer to the latter. The entire lobe thus has a projecting shape, the connecting curve 150 constituting the area with the largest flare.

It is easy to understand that an outer skirt of this type provided on air-cushion vehicles has two important advantages: first of all and this is the main advantage, the projecting nature of the lobes increases the surface of the cells or compartments which these lobes define. The lift surface (section of the cells or compartments) is considerably increased with respect to previously proposed solutions, for virtually unchanged dimensions of the structure platform.

On the other hand and this is particularly important for vehicles intended to travel on the sea, the projecting part of the lobes constitutes all around the vehicle a pneumatic protection belt, which is effective against impact and in particular against the impact of waves.

In a prior art vehicle of this type and more particularly as shown in the accompanying FIGS. 1 and 2, the edge b of the upper part 100 has an arcuate shape corresponding to a section of an ellipse determined by the intersection of an oblique secant plane with the axis of revolution of the cylindrical or conical upper part 100. Consequently, in order to connect the edge b of the upper part 100 to the structure of the platform, it is necessary to give the members supporting the outer skirt a complementary shape, as a section of an ellipse. The present invention proposes an improvement to air-cushion vehicles of French Patent Specification No. 2 465 624, an improvement which appreciably simplifies the connection of the lobes L to the structure being lifted.

According to the invention there is provided an air-cushion vehicle comprising a lifted structure, a central lift cushion and a peripheral lift arrangement comprising a plurality of cells defined on the outside by an outer multilobular skirt, each lobe of the outer skirt being constituted by the assembly of an upper part which diverges in a downwards direction with respect to the structure and of a lower part of revolution which converges in a downwards direction with respect to the structure, so that the entire lobe projects outside the structure, the upper part of the lobes being formed by a central member of substantially coplanar and triangular contour, the base of the central member defining the apex of the upper part and connected to the lifted structure along a horizontal rectilinear line and whereof the apex of the central member being situated in the plane of connection of the two parts, namely the upper part and lower part as well as of two conical envelope members connected to the central member respectively on either side of the latter and connected to the lifted structure along two rectilinear segments disposed in vertical planes, the apices of the conical envelope members being situated on either side of the base of the central member, whereas the bases of the conical envelope members are connected to the lower part in the plane of connection which intersects the lifted structure and constitutes a plane bisecting the angle formed by the outermost generatrices of the upper part and of the lower part.

The base of the central member of substantially coplanar and triangular contour can constitute a horizontal rectilinear segment connecting the upper part to the lifted structure.

If desired, the base of the central member of substantially coplanar and triangular contour can constitute a substantially arcuate horizontal connection of the upper part to the lifted structure.

In a particular embodiment, the upper part of the lobes is also completed by two triangular and flat members, connected to the edges of the conical envelope members, the apices of said triangular members being situated respectively on either side of the base of the central member and the base of these triangular members being situated in the plane of connection of the two upper and lower parts, in order to be connected to the lower part, the outer edges of the two flat triangular members being connected to the lifted structure along two rectilinear segments situated in vertical planes.

Preferably the ratio between the length of the base of the central member, to the height of the upper part is less than 3.

The lower part of the lobes can be frustoconical.

Alternatively, the lower part of the lobes can be cylindrical.

It will be thus understood that the said upper part of each lobe is connected to the lifted structure, along on the one hand a rectilinear horizontal line and on the other hand two rectilinear connections disposed in vertical planes. Consequently, the shape of the lifted structure may be appreciably simplified, this lifted structure advantageously being able to be produced in the form of angle-irons or straight metal members, whilst being connected in a perfectly sealed manner to the outer edge of the lobes.

As will further appear from reading the ensuing detailed description, the central member of substantially coplanar and triangular contour may be made in the form of a flat bevel, or in the form of a rounded envelope.

Depending on the individual case, the base of this central member will be connected to the lifted structure either in the form of a horizontal rectilinear connection, or in the form of a substantially arcuate and preferably circular horizontal connection.

It will also be understood that the upper parts of the lobes are arranged adjacent each other, in the vertical planes containing the rectilinear segments, which on the one hand makes it possible to increase substantially the volume of each lobe with respect to the embodiment described in French Patent Specification No. 2 465 624, in which a gap exists between each upper part as is apparent in the accompanying FIG. 2 and on the other hand to ensure better utilization of the space.

The invention will now be further described, by way of example, with reference to FIGS. 3 to 5 of the accompanying drawings, in which:

FIG. 3 is a diagrammatic front view of a fragment of an air-cushion lift device vehicle formed according to the invention;

FIG. 4 is a developed diagrammatic view of various members constituting the upper and lower parts of a lobe of an air-cushion vehicle formed according to the invention; and FIG. 5 is a diagrammatic perspective view of a fragment of an air-cushion vehicle formed according to the invention showing an arrangement of adjacent lobes.

As shown in FIGS. 3 to 5, the peripheral lift arrangement comprises a plurality of cells defined on the outside by an outer multilobular skirt. Each lobe L of the outer skirt is constituted by the assembly of an upper part 100 which diverges in the downwards direction with respect to the lifted structure and of a lower part revolution 200 which converges in the downwards direction with respect to the structure so that the entire lobe projects outside the structure. The area having the greatest flare is formed by the connecting curve 150 between the upper apart 100 and the lower part 200.

More precisely, the plane containing the connecting curve 150 is a plane bisecting the angle formed by the outermost generatrices of the upper part 100 and of the lower part 200.

One important feature is that said bisecting plane containing the connecting curve 150 does not pass outside the support structure. At the limit, the bisecting plane in question may simply be tangential to the bottom of the supporting structure.

A feature of this type makes it possible to equalize the reaction forces due to air under pressure applied to the upper part 100 and lower part 200, which are exerted in the vicinity of the connecting curve 150. More precisely, these reaction forces are perfectly symmetrical with respect to the connecting curve 150.

Consequently, the resultant of the aforesaid reaction forces, is exerted in the plane containing the connecting curve. In view of the fact that this plane intersects ths supporting structure, it will be understood that this arrangement prevents any stress in the flexible material constituting the envelope of the skirt. The latter is thus perfectly stable.

The edge of the upper part 100 is constituted by a first upper segment $b_1$ located in a horizontal plane. This upper segment $b_1$ defines the apex of the upper part 100, it is connected to the lifted structure along a horizontal rectilinear line. Furthermore, the edge of the upper part 100 is completed by two rectilinear segments $b_2$, which are respectively connected to the lifted structure along a rectilinear connection disposed in a vertical plane A.

More precisely, the upper part 100 of the outer skirt is formed, on the one hand, by a central member 101 of substantially coplanar and triangular contour, whereof the base forms the said first upper segment $b_1$ located in a horizontal plane, when the lobe L is fitted to the lifted structure and whereof the apex 102 is situated in the plane of connection 150 of the two parts, namely the upper part 100 and lower part 200, on the other hand, by two conical envelope members 103, 104, when the lobe is assembled, connected to the central triangular member 101, respectively on either side of the latter, the base of the conical envelope members 103, 104 being connected to the lower part 200 on the aforesaid plane of connection 150, whereas the apices 105, 106 of these two conical envelope members 103, 104 are situated on either side of the base $b_1$ of the central member 101.

As is apparent from the accompanying drawings, in one embodiment of the invention, the outer edges of the conical envelope members 103, 104 constitute the two rectilinear segments $b_2$, intended to be connected to the lifted structure, along two vertical planes A.

As is apparent from FIG. 5, when the lobes L, according to the present invention, are intended to be connected to a portion of the rectilinear lifted structure (in particular lobes $L_1$ to $L_3$ and $L_8$ to $L_{10}$), the first segment $b_1$, located in a horizontal plane and defining the apex of the upper part 100 is advantageously constituted by a horizontal rectilinear segment. In this case, the central member 101 of this upper part 100 may have an absolutely flat, triangular shape, the pressurization of the lobe, resulting in a slight deformation of this member, as will be explained in more detail in the following description.

In addition, as is also apparent from FIG. 5, for a rectilinear lifted portion of the structure, the rectilinear segments $b_2$ formed by the edges of the conical envelope members 103, 104 are connected to the lifted structure along a rectilinear attachment located respectively in two vertical and parallel planes A, such as the planes $A_1$ and $A_2$ for the rectilinear segments $b_2$ of the lobe $L_1$. According to one advantageous embodiment, the rectilinear segments $b_2$ are more precisely vertical.

Naturally, in the case where a lobe $L_5$, $L_6$ is intended to be connected to a portion of the lifted structure comprising a curved envelope, it proves preferable to give the base of the central member 101 of substantially coplanar, triangular contour, of the upper part 100, a slightly arcuate shape in a manner such that the latter which forms the first segment $b_1$ located in a horizontal plane when the lobe is installed on the lifted structure and defines the apex of the upper part 100, follows the outer contour of side structure perfectly.

However, in most cases, even when the contour of the lifted structure has an outer rounded contour, in particular at the corners of the structure, since the radius of curvature of such an area is relatively great with regard to the dimensions of each lobe, the result of this is that the central member 101 of the upper part 100 may be made in the form of a perfectly triangular, initially flat member. Before fitting the lobe L to the lifted structure, the base of the triangular central member 101 may thus be perfectly rectilinear, however, since the upper attachment has features of flexibility, the base $b_1$ of the triangular central member 101 will easily be adapted to the shape of the structure.

As is apparent from FIG. 5, the rectilinear segments $b_2$ formed by the edges of the conical envelope members 103, 104, which are connected to the lifted structure on a portion of the latter having a generally rounded contour, are disposed in two vertical, non-parallel planes A. Thus, the rectilinear segments $b_2$ formed by the edges of the conical envelope members 103, 104 of the lobe $L_5$ are respectively situated in non-parallel, vertical planes $A_5$, $A_6$ and which intersect substantially at the centre of curvature of the portion of lifted structure in question. Here too, the rectilinear segments $b_2$ may be arranged vertically.

Naturally, it will be understood that the lifted structure may be produced very simply in the form of assorted sectional members or straight metal members, or wooden support members which are equally straight, if necessary, cylindrical support members.

As is also shown in FIG. 5, the lower part 200 of the lobes L of the outer skirt, intended to be connected to a rectilinear face of the lifted structure such as the lower part 200 of the lobes $L_1$ to $L_4$ and $L_7$ to $L_{10}$ advantageously has a cylindrical shape, whereas the lower part 200 of the lobes such $L_5$ and $L_6$ of the outer skirt, intended to be connected in the vicinity of an inwardly curved area of the lifted structure, advantageously have a frustoconical shape.

Moreover, as is shown in FIGS. 4 and 5, the upper part 100 of the lobe L of the outer skirt may be completed by two flat and triangular members 107, 108 (shown in broken line), connected to the edges of the aforesaid conical envelope members 103, 104. The apices of the triangular members 107, 108 are situated respectively on either side of the said first segment $b_1$ and coincide with the apices 105, 106 of the conical envelope members 103, 104. Moreover, the base 109, 110 of the two triangular members 107, 108 connected on either side of the conical envelope members 103, 104, is located in the plane of connection 150 of the two parts, namely the upper part 100 and lower part 200. Consequently, it will be understood that in such a case the outer edges 111, 112 of the two lateral triangular members 107, 108 constitute the two rectilinear segments $b_2$ connected to the lifted structure along a vertical plane.

The rectilinear segments $b_2$ formed by the edges of the members 107, 108 of triangular shape, connected on either side of the conical envelope members 103, 104 are disposed in vertical planes A, parallel to each other ($A_1$, $A_2$) when the portion of structure in question is rectilinear, as is the case for the lobes $L_1$ to $L_4$ and $L_7$ to $L_{10}$ and which are not parallel to each other ($A_5$, $A_6$) when the portion of structure in question has a rounded outer contour, as is the case for the lobes $L_5$ and $L_6$.

Naturally, the particular shape and dimensions of the members 107, 108 attached on either side of the conical envelope members 103, 104 are determined in accordance with the particular contour of the lifted structure, in order to ensure a perfectly sealed connection between the latter and the edge b of the upper part 100.

Moreover, it has been stated that in order to limit the deformation of the substantially triangular central member 101 of the upper part 100, which central member is initially flat, it was preferably to give said central member 101 dimensions such that: the ratio of its base forming the first segment $b_1$, to the height of this same central member 101, is less than 3.

The supply of air to the various cushions could be achieved by any conventional means and in particular from orifices provided in the lower wall of the lifted structure and which are connected to a diffusion chamber, as described in French Patent Specification Nos. 2 465 624, 2 301 422 and 2 181 251. Other supply methods can be used in order to ensure optimum inflation of the lobes at the time of pressurization.

If desired, the substantially triangular central member 101 could advantageously be produced in the form of an initially non-flat member, in order to be able to withstand a relatively great deformation when pressurizing the lobe L.

What is claimed is:

1. An air-cushion vehicle comprising a lifted structure, a central lift cushion and a peripheral lift arrangement comprising a plurality of cells defined on the outside by an outer multilobular skirt, each lobe of the outer skirt being constituted by the assembly of an upper part which diverges in a downwards direction with respect to the structure and of a lower part of revolution which converges in a downwards direction with respect to the structure, so that the entire lobe projects outside the structure, the upper part of the lobes being formed by a central member of substantially coplanar and triangular contour, the base of the central member defining the apex of the upper part and being connected to the lifted structure along a horizontal rectilinear line and whereof the apex of the central member being situated in the plane of connection of the two parts, namely the upper part and lower part as well as of two conical envelope members connected to the central member respectively on either side of the latter and connected to the lifted structure along two rectilinear segments disposed in vertical planes, the apices of the conical envelope members being situated on either side of the base of the central member, whereas the bases of the conical envelope members are connected to the lower part in the plane of connection which intersects the lifted structure and constitutes a plane bisecting the angle formed by the outermost generatrices of the upper part and of the lower part.

2. An air-cushion vehicle according to claim 1, in which the base of the central member of substantially coplanar and triangular contour constitutes a horizontal rectilinear segment connecting the upper part to the lifted structure.

3. An air-cushion vehicle according to claim 1, in which the base of the central member of substantially coplanar and triangular contour constitutes a substantially arcuate horizontal connection of the upper part to the lifted structure.

4. An air-cushion vehicle according to any one of claims 1 to 3, in which the upper part of the lobes is also completed by two triangular and flat members, connected to the edges of the conical envelope members, the apices of said triangular members being situated respectively on either side of the base of the central member and the base of these triangular members being situated in the plane of connection of the two parts, namely the upper part and lower part, in order to be connected to the lower part, and the outer edges of the two flat triangular members being connected to the lifted structure along two rectilinear segments situated in vertical planes.

5. An air-cushion vehicle according to claim 1, in which the ratio between the length of the base of the central member to the height of the upper part is less than 3.

6. An air-cushion vehicle according to claim 1, in which the lower part of the lobes is frustoconical.

7. An air-cushion vehicle according to claim 1, in which the lower part of the lobes is cylindrical.

* * * * *